May 11, 1937. G. E. FRAZIER 2,080,308
METHOD FOR TESTING ELECTRICAL CONDENSERS
Filed Feb. 27, 1936
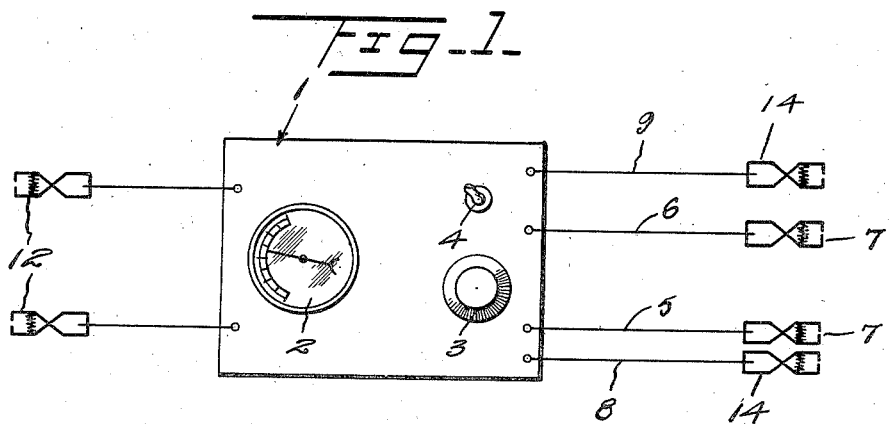
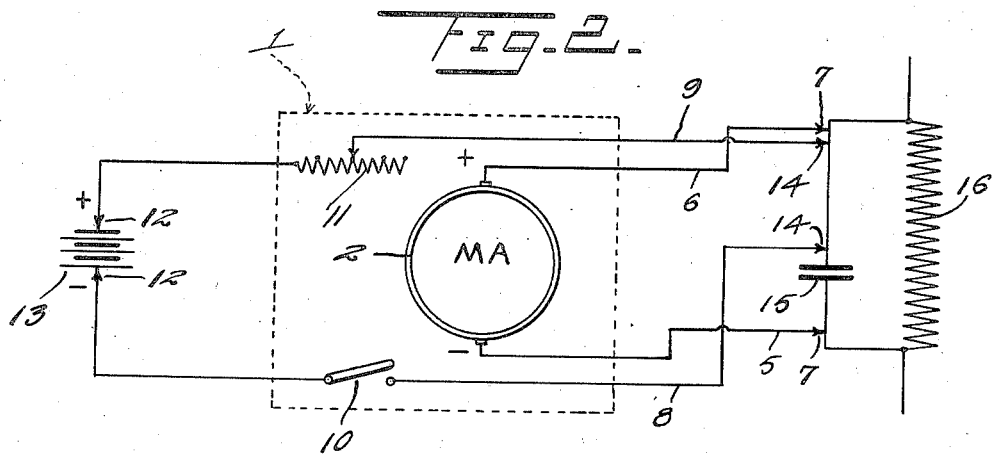
Inventor
G. E. Frazier
By Watson E. Coleman
Attorney Patented May 11, 1937

2,080,308

UNITED STATES PATENT OFFICE 2,080,308

METHOD FOR TESTING ELECTRICAL CONDENSERS

George E. Frazier, Clever, Mo., assignor of fifty per cent to Gus Wampler, Springfield, Mo.

Application February 27, 1936, Serial No. 66,120

1 Claim. (Cl. 175—183)

This invention relates to the class of electrical devices and pertains particularly to the class of testing.

In electrical circuits where condensers are made use of across other electrical devices, as in radio circuits, it frequently becomes necessary to test the condenser to determine whether or not the same has broken down and is allowing the direct passage of current from one side to the other. At the present time the only method known is to disconnect the lead from one side of the condenser which joins the same in the circuit with the adjacent electrical device across which the condenser is connected, and then connect the condenser in an electric circuit having in series therein a source of electric potential and a current-flow detecting instrument. If the condenser has failed the instrument will then show a deflation of its needle.

The primary object of the present invention is to provide an apparatus by which the condenser may be tested without requiring its disconnection at one side of the circuit in which it is placed.

Another object of the invention is to provide an apparatus and method for testing a condenser in the manner described, in which the apparatus is of simple construction and the method may be easily and quickly carried out.

The invention will be best understood from a consideration of the following detailed description taken in connection with the accompanying drawing forming part of this specification, with the understanding, however, that the invention is not confined to any strict conformity with the showing of the drawing but may be changed or modified so long as such changes or modifications mark no material departure from the salient features of the invention as expressed in the appended claim.

In the drawing:

Figure 1 is a view in plan of the instrument embodying the present invention showing the several wire terminals connected therewith.

Figure 2 is a diagram of the electrical circuits of the device.

Referring more particularly to the drawing wherein like numerals of reference designate corresponding parts throughout the several views, Fig. 1 illustrates the device constructed in accordance with the present invention for carrying out the method described. This comprises a suitable housing 1 having a current flow indicating instrument 2 mounted in the face thereof and having mounted upon the face a rheostat control knob 3 and a switch controlling button 4.

Fig. 2 illustrates the wire layout for the instrument 1. As shown the meter 2 has the two electrical conductors 5 and 6 leading respectively from the negative and positive sides thereof and each terminating in a clip 7. These conductors 5 and 6 pass through suitable openings in the face of the casing 1 so that the clips 7 may be conveniently attached to the terminals of the electric instrument to be tested, as hereinafter described.

The numerals 8 and 9 indicate current conducting wires which pass through the housing 1 and the wire 8 has therein the switch 10 which is controlled by the button or lever 4 while the wire 9 has connected therein the rheostat 11, the movable arm of which is controlled from the outside of the instrument casing by the knob 3. Each of the wires 8 and 9 passes out of the face of the casing at one end adjacent the wires 5 and 6 and the other ends of these wires 8 and 9 also pass out from the inside of the casing and are provided with clips 12 by which the wires may be joined with opposite sides of a storage battery 13 or other suitable source of direct current. The opposite ends of the wires 8 and 9 have clips 14 thereon for the purpose hereinafter described.

In carrying out the present method of testing, if an electric condenser which is indicated at 15, is connected across an inductance 16 in the manner illustrated, and it is suspected that this condenser has broken down and is allowing current to pass, the clip 7 of the wire 6 and clips 14 of the wires 8 and 9 are secured to one side of the suspected condenser 15 without disconnecting this side of the condenser from the coil 16. The clip 7 of the wire 5, which is connected with the other side of the meter 2, is then attached to the other side of the condenser 15, and after setting the rheostat as desired the switch 10 is closed.

Upon closing the switch 10 current will flow through the circuit which includes the battery 13, the rheostat 11, the clips 14 and the section of wire between and to which the clips 14 are attached. Adjustment of the rheostat knob 3 to build up an increasingly heavy current flow through the section of wire between the clips 14, will result in the heating up of this wire to a sufficient degree that if the condenser 15 is broken down or partly broken down, the resistance between the clips 14 will effect the flow of some current across the condenser to the clip 7 or wire 5 and this leaking current will then flow through the meter 2 to the wire 6 and into the side of the battery circuit indicated by the numeral 9. Naturally if the condenser 15 is in good condition the meter 2 will not show any current flow.

From the foregoing it will be apparent that much time and labor can be saved by carrying out the described testing process with the device herein set forth.

What is claimed is:

The method of testing an electric device while in circuit, which comprises connecting two sides of a current flow detecting instrument with the current conductors leading to the two sides of the device whereby the instrument bridges the device and portions of the current conductors, then connecting a portion of the current conductor lying between one side of the device and the point of connection of one side of the instrument therewith, in circuit with a controlled source of electric potential and noting the action of said instrument.

GEORGE E. FRAZIER.